(12) United States Patent
Perotto et al.

(10) Patent No.: US 6,231,079 B1
(45) Date of Patent: May 15, 2001

(54) HYBRID GENERATOR WITH PERFORATING PILLAR

(75) Inventors: Christian Perotto, Ballancourt; Christophe Haegeman, Palaiseau; Franck Lebaudy, Lardy, all of (FR)

(73) Assignee: Livbag SNC, Vert le Petit (FR)

( * ) Notice: Subject to any disclaimer, the term of this patent is extended or adjusted under 35 U.S.C. 154(b) by 0 days.

(21) Appl. No.: 09/567,229

(22) Filed: May 9, 2000

(30) Foreign Application Priority Data

May 21, 1999 (FR) .................................................. 99 06468

(51) Int. Cl.⁷ ....................................................... B60R 2/28
(52) U.S. Cl. ............................................. 280/737; 280/741
(58) Field of Search .................................... 280/737, 741

(56) References Cited

U.S. PATENT DOCUMENTS

| | | |
|---|---|---|
| 3,690,695 | 9/1972 | Jones, Sr. . |
| 5,464,247 | 11/1995 | Rizzi et al. . |
| 5,564,740 * | 10/1996 | Zakula ................................. 280/737 |
| 5,590,906 * | 1/1997 | Faigle et al. ......................... 280/741 |
| 5,610,444 | 3/1997 | Austruy et al. . |
| 5,620,204 * | 4/1997 | Frey ..................................... 280/737 |
| 5,863,067 * | 1/1999 | Blumenthal et al. ................ 280/741 |
| 6,024,379 * | 2/2000 | Blumenthal et al. ................ 280/737 |

FOREIGN PATENT DOCUMENTS

| | | |
|---|---|---|
| 195 45 077 A1 | 6/1997 | (DE) . |
| 2 322 436 | 8/1998 | (GB) . |
| 10250525 | 9/1998 | (JP) . |
| WO 98/09850 | 3/1998 | (WO) . |
| WO 98/12078 | 3/1998 | (WO) . |

* cited by examiner

Primary Examiner—Kenneth R. Rice
(74) Attorney, Agent, or Firm—Oliff & Berridge, PLC

(57) ABSTRACT

The present invention relates to the field of hybrid gas generators intended to inflate an airbag to protect the occupants of a motor vehicle.

The generator (1) according to the invention consists of a metal tube (2) containing an internal partition (26) having a central orifice (27) closed by a diaphragm (28). This partition divides the generator into a reservoir chamber (29) containing the pressurized gases and a combustion and mixing chamber (46) containing a pyrotechnic device (4) extended by a support piece (30) containing a piston-pillar (31) which rests against the diaphragm (28). The stroke of the piston is limited by fins and the base of the piston acts as a deflector, preventing hot gases from entering the reservoir chamber (29) during operation, so that this chamber can contain a greater amount of gas.

7 Claims, 4 Drawing Sheets

HYBRID GENERATOR WITH PERFORATING PILLAR

The present invention relates to the field of protecting the occupants of a motor vehicle using an inflatable airbag. More specifically, the invention relates to a hybrid gas generator of tubular shape for inflating such an airbag.

In order to inflate an airbag to protect the occupants of a motor vehicle, use has been made, in the past, of pressurized gas reservoirs opened by a pyrotechnic valve. Thus, U.S. Pat. No. 3,690,695 describes a device for inflating a protective airbag. This device consists of a reservoir of gas under pressure which is isolated from the duct leading to the airbag by a gastight diaphragm against which a finned solid piston rests.

In the event of a collision, a pyrotechnic primer placed behind the piston causes the piston to move forward, tear the diaphragm and allow the pressurized cold gases to enter the said duct. As the hot gases resulting from the combustion of the pyrotechnic charge cannot mix with the cold gases, these are heated up by passing over a bed of magnesium which reacts with them. A device such as this is dangerous in terms of its principle of operation, and has to be produced in a complex way.

Attempts have therefore been made at developing hybrid gas generators containing, on the one hand, a reservoir of cold gases under pressure and, on the other hand, a pyrotechnic charge capable of fulfilling two functions: opening the gas reservoir and heating the cold gases.

PCT application WO 98/09850 thus describes a hybrid generator of tubular shape containing a pressurized gas and a piston coupled to a pyrotechnic initiator. In the event of a collision, the triggering of the initiator causes the piston to move and open the generator at its opposite end to the pyrotechnic initiator and also to heat up the cold gases by mixing, inside the generator, of these gases with the hot gases supplied by the pyrotechnic initiator. As this takes place, an abrupt rise in pressure inside the generator is observed and, for obvious safety reasons, the amount of gas that can be stored in the generator is limited to well below its theoretical maximum value. Finally, a generator in which the stroke of the piston has to be guided along the entire length of the generator is relatively expensive to produce.

To simplify the actual production of the generator, there has therefore been proposed, for example in PCT application WO 98/12078, a type of tubular hybrid generator with lateral gas outlet orifices, the reservoir for pressurized cold gases being located on one side of these orifices, and the pyrotechnic chamber being located on the other side. The gas reservoir is opened by a hollow piston which has a central duct which, after opening, allows the hot gases to enter the reservoir to mix with the cold gases. The heated mixture then leaves the reservoir via the gap around the piston resulting from the breakage of the diaphragm which used to close the reservoir.

Although this solution does indeed yield tubular hybrid generators which are relatively simple to produce, it does not do away with the drawbacks that result from the fact that the hot gases from the combustion of the pyrotechnic charge enter the inside of the reservoir for pressurized cold gases.

This type of drawback is seen also in the solutions which, for opening the reservoir, use a projectile instead of a piston, as described, for example, in U.S. Pat. No. 5,464,247.

Tubular hybrid generators are particularly wanted for inflating front or side airbags for protecting the passengers of motor vehicles, but those skilled in the art do not currently have such tubular hybrid generators available to them which, simultaneously, are simple to produce and perform all of the mixing of the hot gases originating from the combustion of the pyrotechnic charge with the cold gases stored in the reservoir, outside the latter.

The object of the present invention is precisely to provide such a generator.

The invention therefore relates to a hybrid gas generator consisting of a tubular body with an upstream end closed by a pyrotechnic primer device and a downstream end which is closed in a gastight manner, the said tubular body also having gas outlet orifices and containing an internal partition with a central orifice of cross section S closed by a diaphragm, the said partition dividing the said tubular body into two parts:

an upstream part forming a combustion and mixing chamber and containing the primer device, the gas outlet orifices and a pyrotechnic charge that generates hot gases, a downstream part forming a reservoir chamber containing at least one pressurized gas, characterized in that the said tubular body in its upstream part, between the pyrotechnic charge and the said internal partition, contains a support piece which is fixed to the said tubular body without coming into contact with the said internal partition or with the said gas outlet orifices and which contains a solid mobile piston consisting of at least one column of cross section s, smaller than the cross section S, which rests against the diaphragm, closing the central orifice of the internal partition, the said column, at its opposite end to the said partition, having a solid base of cross section So larger than S and which bears peripheral ribs preventing the said base from coming into contact with the said central orifice. In general, the support piece will be hollow and the peripheral ribs will be located away from the said central orifice.

It is the use of a solid mobile piston which, in its downstream part, has a column which can enter the central orifice of the internal partition without blocking it off and, in its rear part, has a widened solid base extended by ribs peripheral to the column so as to prevent the said central orifice from being blocked off by the said base which makes it possible to achieve the objective of the invention. Specifically, once the reservoir chamber has been opened by the column of the mobile piston, the cold gases can leave the reservoir chamber via that part of the central orifice of the internal partition which is left uncovered by the column of the piston to enter the combustion and mixing chamber. At the same time, the widened base of the piston acts as a deflector for the hot gases which originate from the combustion of the pyrotechnic charge. These hot gases cannot enter the reservoir chamber but are made to mix with the cold gases to constitute the gaseous mixture which leaves the generator through its outlet orifices.

According to a first preferred embodiment of the invention, prior to pyrotechnic operation, the said hollow support piece and the said solid mobile piston isolate the said pyrotechnic charge from the said gas outlet orifices.

This embodiment makes it possible to ensure good protection and good preservation of the pyrotechnic charge over time.

According to a second preferred embodiment of the invention, the said support piece consists of a hollow ring crimped against the body of the generator, the said ring having a central cylindrical recess which has an internal shoulder so that it has a diameter $d_1$ facing the pyrotechnic charge and a diameter $d_2$ facing the internal partition, $d_2$ being greater than $d_1$, the said ring being extended, facing the internal partition, by a hollow cylindrical neck, the inside diameter of which is equal to $d_2$, and the outside diameter of which is smaller than the inside diameter of the tubular body.

In this case, the said solid mobile piston advantageously consists, on the one hand, of a cylindrical body which has a cylindrical shank of outside diameter $d_1$, a cylindrical base of outside diameter $d_3$ between $d_1$ and $d_2$ and a cylindrical column of cross section s and of length l and, on the other hand, of fins of height h smaller than l which surround the column and which rest on the base of the said body, the said fins constituting the peripheral ribs.

In this embodiment, the base of the mobile piston rests on the internal shoulder exhibited by the support ring and the shank of the piston, the height of which has to be less than the stroke of the piston, enters the central recess of the ring facing the pyrotechnic charge.

In this embodiment, once the pyrotechnic charge has fired, the hot gases begin to drive the mobile piston without being able to mix with the cold gases originating from the reservoir chamber. This then yields a hybrid generator which causes the protective airbag to start to deploy using only cold gases.

According to a third preferred embodiment of the invention, the said fins constitute a single piece exhibiting a central duct of cross section S, the said piece being force fitted onto the said column of the piston.

Advantageously, the cylindrical body of the piston will be a metal body and the said single piece will be made of a rigid plastic.

Finally, according to a fourth preferred embodiment of the invention, the tubular body of the generator will consist of a single metal tube. In this case, the internal partition and its diaphragm will advantageously be fixed to the said metal tube by a single laser-welding operation performed from the outside by transparency through this tube.

The invention thus provides a hybrid tubular generator which is simple and inexpensive to assemble. This generator makes it possible to mix the hot gases and the cold gases while at the same time preventing the hot gases from entering the reserve of cold gases. In a given reservoir-chamber volume, it is therefore possible to compress a greater amount of gas than can be stored in a hybrid generator with the same characteristics but which does not exhibit this safety feature.

This possibility is enhanced by the fact that, prior to pyrotechnic operation, the column of the mobile piston rests against the diaphragm which closes the reservoir chamber and acts, with respect to this diaphragm, as a mechanical pillar improving its resistance to pressure.

A detailed description of one preferred embodiment of the invention is given hereinafter with reference to FIGS. 1 to 8.

Figure 1:
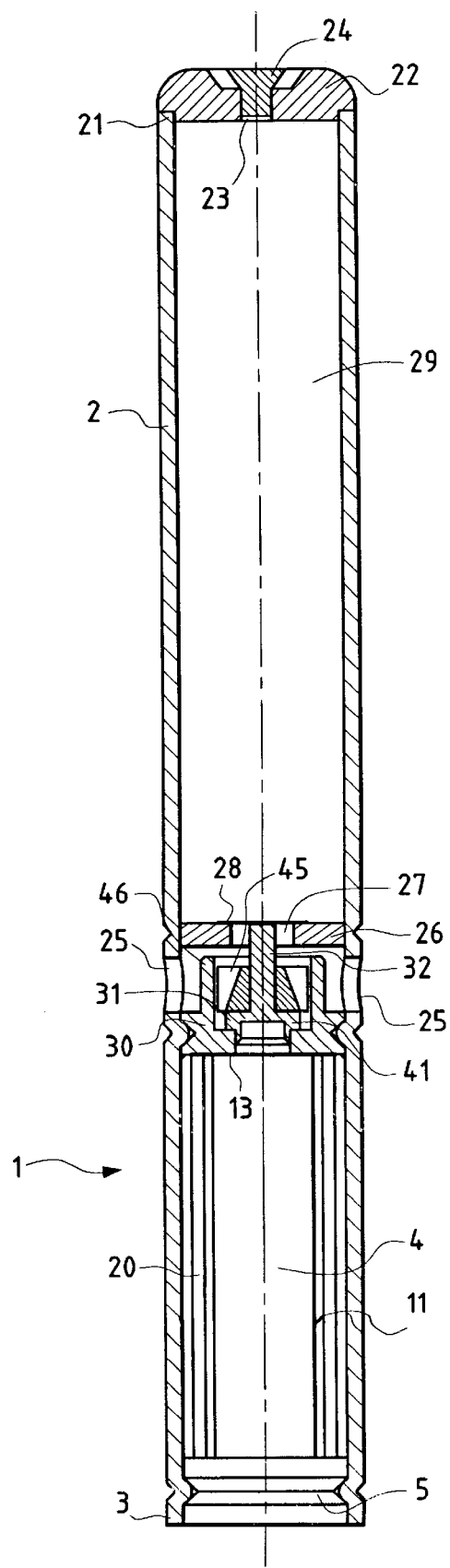
FIG. 1 depicts, in axial section, a hybrid tubular generator according to the invention.
Figure 7:
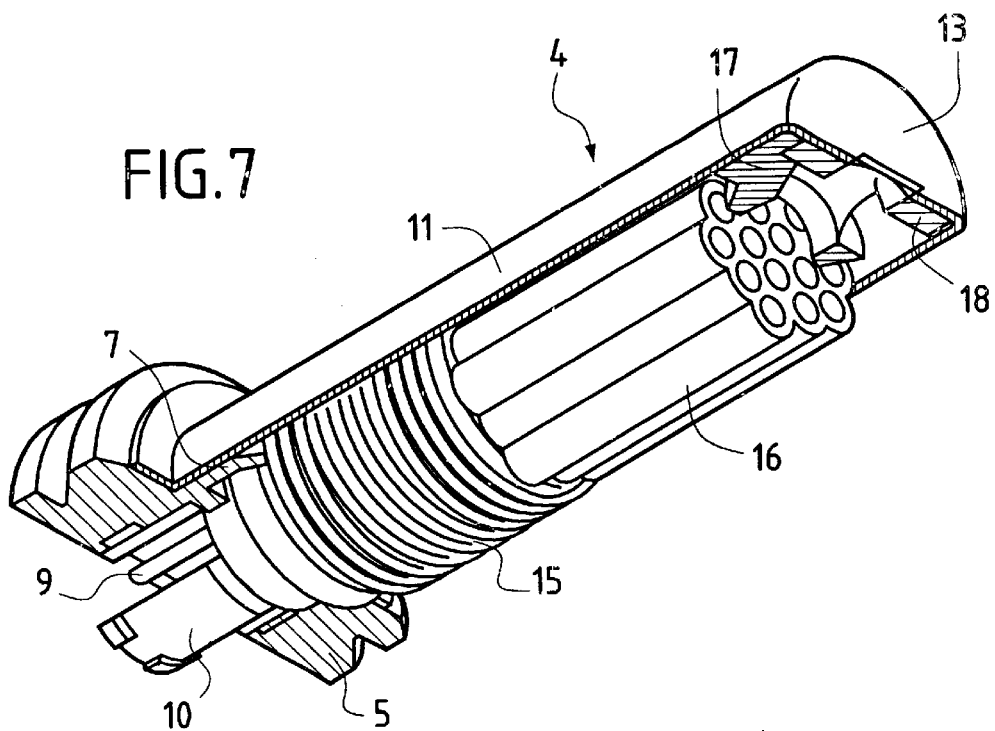
FIG. 7 depicts, in perspective with partial cutaway, the pyrotechnic primer device of the generator depicted in FIG. 1.

FIG. 1 depicts a hybrid gas generator 1 according to the invention. This generator 1 consists of a tubular body 2 made of steel. The tube 2 has an upstream end 3 into which is crimped a metal ring 5 which forms part of a pyrotechnic primer device 4 which has not been sectioned but which is depicted in detail in FIGS. 7 and 8.

The priming device 4 is thus made up of a primer carrier 6 which has a base 5 in the shape of a hollow ring which is extended by a hollow neck 7 into which an electropyrotechnic igniter 8 is crimped, the electrodes 9 of which igniter are protected by a shunt ring 10. A cylindrical metal cap 11 is fitted around the neck 7 and rests on the base 5 via a flared part 12 bonded to the said base 5. At its opposite end to the said flared part 12, the cap 11 has a precut flat face 13 which can open under the effect of an increase in pressure.

The igniter 8 has a narrow upper part 14 surrounded by a spring 15 which supports a pyrotechnic charge 16 in the form of a multiperforated lobed block. This block is held at its upper part by a perforated packing piece 17 which supports a disc 18 which comes into contact with the face 13 and has a central orifice 19. The pyrotechnic charge 16 will advantageously consist of a block of composite solid propellant based on ammonium perchlorate and sodium nitrate and containing a silicone binder as described, for example, in U.S. Pat. No. 5,610,444, the cap 11, prior to operation, providing gastight isolation.

As the outside diameter of the cap 11 is smaller than the inside diameter of the tube 2, a tubular spacer piece 20 made of plastic is inserted between the cap 11 and the tube 2 to act as a volume compensator and prevent the cap 11 from exploding sideways when the charge 16 is ignited.

The tube 2 also has a downstream end 21 onto which a metal plug 22 comprising a gas filler orifice 23 is welded. This orifice 23 is itself closed in a gastight manner by a plug of weld material 24.

Downstream of the pyrotechnic primer device 4, the tube 2 has gas outlet orifices 25, the centres of which are distributed in one and the same radial plane perpendicular to the generatrices of the cylindrical tube 2.

Downstream of these orifices 25, the tube 2 contains an internal partition 26 which has the shape of a flat disc with a central orifice 27 of circular cross section S. The partition 26 is placed inside a diaphragm cap 28. The partition 26 and the diaphragm cap 28 consist of metal elements and may thus be fixed to the tube 2 in a gastight manner in a single laser-welding operation.

The partition 26 closed by the diaphragm 28 thus divides the interior of the generator 1 into two distinct parts:
- an upstream part containing the primer device 4 with its pyrotechnic charge 16 and the gas outlet orifices 25, this upstream part forming a combustion and mixing chamber 46,
- a downstream part forming a reservoir chamber 29 intended to contain at least one pressurized gas.

Gases which might be used are inert gases such as nitrogen, argon, helium or mixtures of inert gases and oxidizing gases such as air or argon/oxygen mixtures. The use of such gaseous mixtures containing oxidizing gases is advantageous when the pyrotechnic charge gives off reducing gases.

The tubular body 2 also contains, in its upstream part, a hollow support piece 30 which comes into contact with the face 13 of the cap 11 of the primer device 4. This hollow support piece 30 is fixed to the tube 2 by crimping without coming into contact with the internal partition 26 or with the gas outlet orifices 25. The support piece 30 contains a solid mobile piston 31 which has a column 32 with a cross section smaller than the cross section S of the central orifice 27 borne by the internal partition 26. This column 32 rests against the diaphragm 28 closing the orifice 27 and thus constitutes a pillar which enhances the resistance of the said diaphragm to the pressure of the gases contained in the chamber 29.

Figure 2:
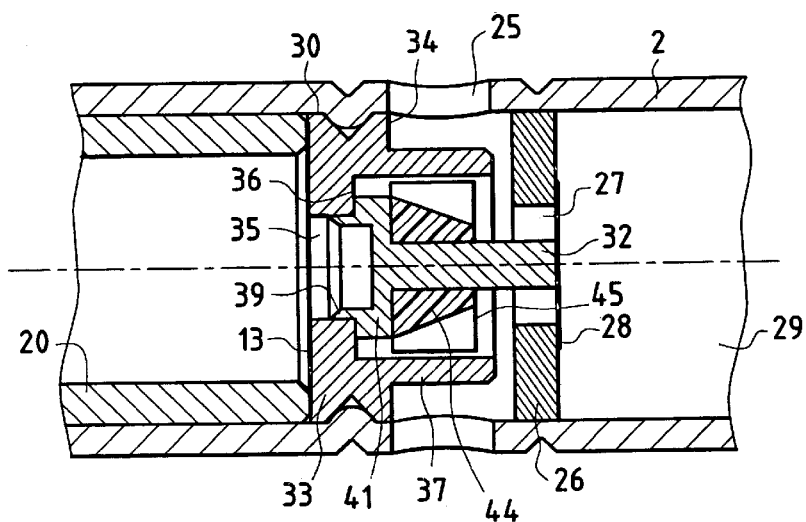
FIGS. 2 to 4 are sectional views of the generator depicted in FIG. 1 in the region containing the support ring, the mobile piston and the internal partition, the views being respectively prior to pyrotechnic operation, at the start of pyrotechnic operation and during pyrotechnic operation.
Figure 5:
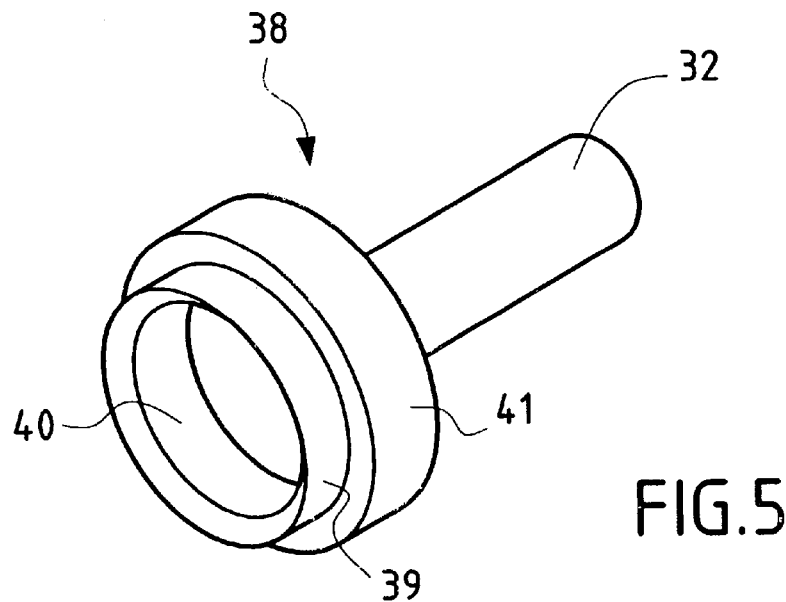
FIG. 5 is a perspective view of the body of the mobile piston.
Figure 6:
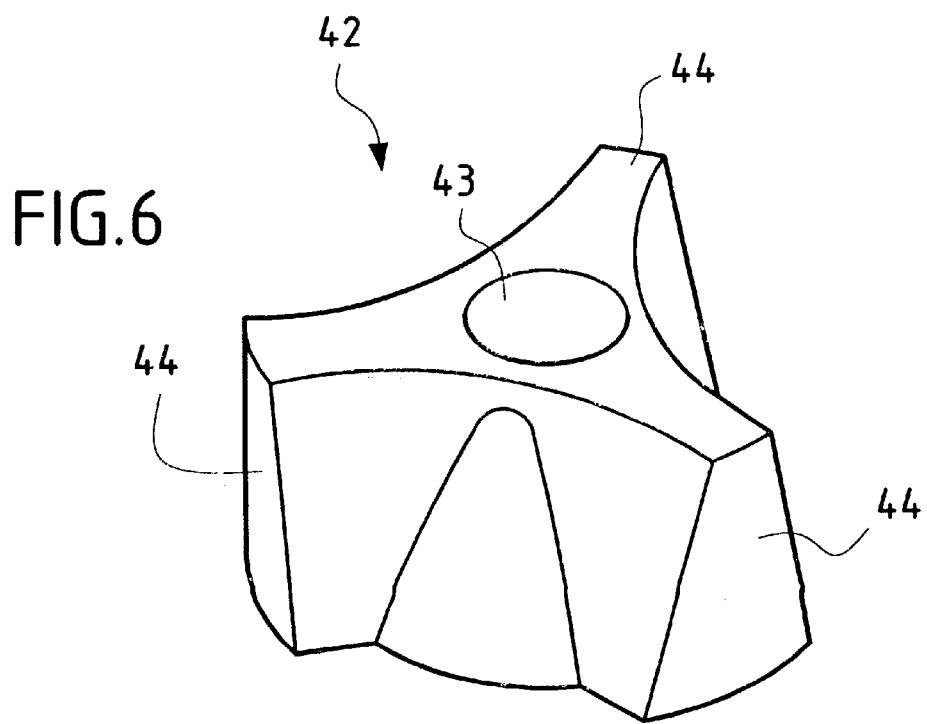
FIG. 6 is a perspective view of the single piece intended to be force fitted onto the column of the piston.

The support piece 30 and the mobile piston 31 are now described in detail with more particular reference to FIG. 2 and also to FIGS. 5 and 6 in the case of the piston 31.

The support piece 30 is a metal piece consisting of a hollow cylindrical ring 33 which comes into contact with the spacer piece 20 and which is fixed by crimping into the tube 2, the downstream flat surface 34 of this ring 33 being at the upstream extremity of the orifices 25, without blocking them off. The ring 33 has a central cylindrical recess 35 which has an internal shoulder 36. The recess 35 thus has a diameter $d_1$ facing the pyrotechnic charge 16 and a different diameter $d_2$ facing the internal partition 26, $d_2$ being greater both than $d_1$ and than the diameter d of the central orifice 27 of the partition 26. The hollow ring 33 is extended facing the internal partition 26 by a hollow cylindrical neck 37 which does not come into contact with the said partition 26. The inside diameter of this neck 37 is equal to $d_2$, whereas its outside diameter is smaller than the inside diameter of the tubular body 2.

The piston 31 consists, on the one hand, of a cylindrical metal body 38 which has a cylindrical shank 39 of outside diameter $d_1$ and has a central cavity 40, the role of which will be explained later on in the description. The body 38 also has a solid cylindrical base 41 of outside diameter $d_3$, which is between $d_1$ and $d_2$. Finally, the body 38 has a cylindrical column 32 of cross section s and length l. The body 38 consists of a single metal piece, the column 32 being obtained by upsetting the metal which initially occupies the volume of the cavity 40.

The piston 31 also consists of a single piece 42 made of rigid plastic of uniform height h and having a cylindrical central duct 43 of cross section s allowing the said piece 42 to be force fitted onto the column 32 of the body 38 to form the piston 31. The single piece 42 has three lateral sectors in the form of fins 44. The height h of the single piece 42 and therefore of the fins 44 is less than the length l of the column 32 and even, in the embodiment depicted, less than the height of the neck 37 of the support piece 30.

The maximum diametral size of the single piece 42 is also equal to $d_2$.

When the piston 31 has been formed, the piece 42 rests on the base 41 of the body 38 and the fins 44 surround the column 32, thus constituting, with respect to this column, external ribs 45.

When the piston 31 has been formed and after it has been fitted into the support piece 30, the shank 39 of the body 38 enters the upstream part of the recess 35. When this happens, the hollow support piece 30 and the piston 31 separate in gastight manner the gas outlet orifices 25 and the pyrotechnic charge 16 contained in the primer device 4.

The generator 1 just described is very simple to assemble. The tubular body 2 with the orifices 25 is taken up and the partition 26 surrounded by the diaphragm cap 28 is fitted by precrimping. The partition 26 and the diaphragm cap 28 are then fixed to the tube 2 by a single laser-welding operation performed from the outside by transparency through the tube 2. The metal plug 22 is then welded onto the downstream end 21 of the tube 2. The support piece 30 containing the piston 31 is then fitted and crimped into the tube 2 so that the end of the column 32 comes into contact with the diaphragm cap 28. The spacer piece 20 and the pyrotechnic primer device 4 are then fitted and the tube 2 is crimped onto the ring 5 of the primer device 4. The reservoir chamber 29 is finally filled with gas through the orifice 23 which is then closed by the plug of weld material 24.

Figure 3:
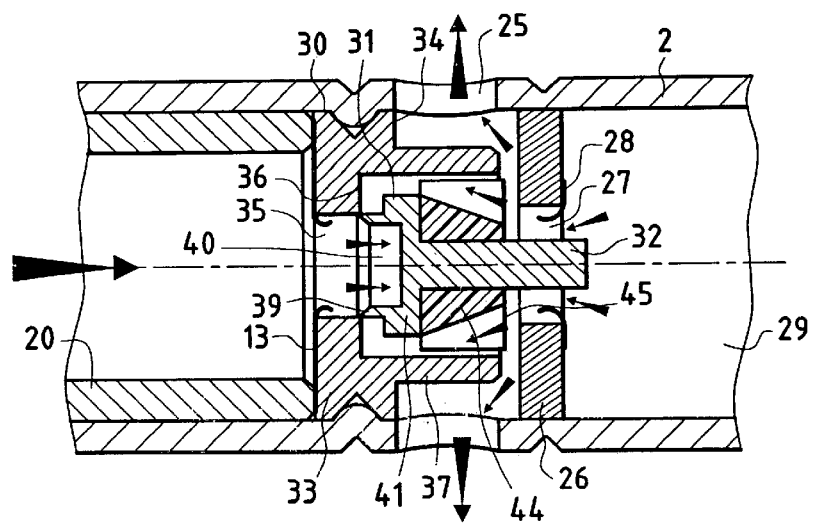
Figure 4:
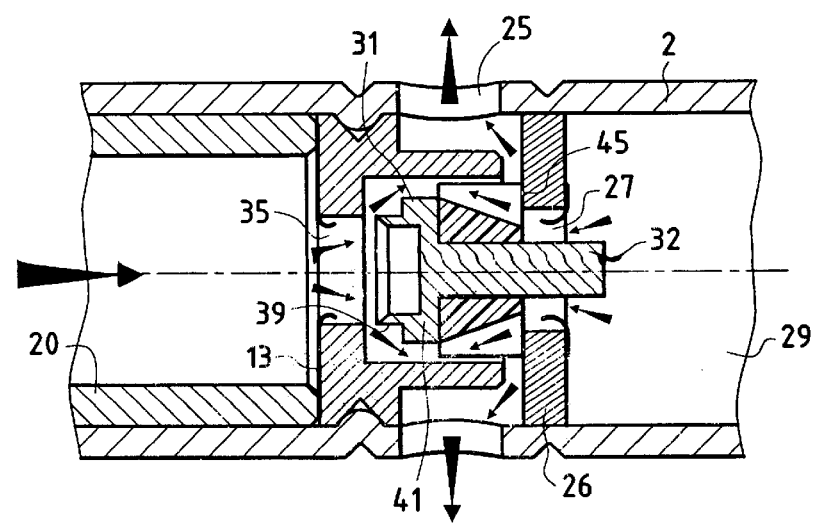
Figure 8:
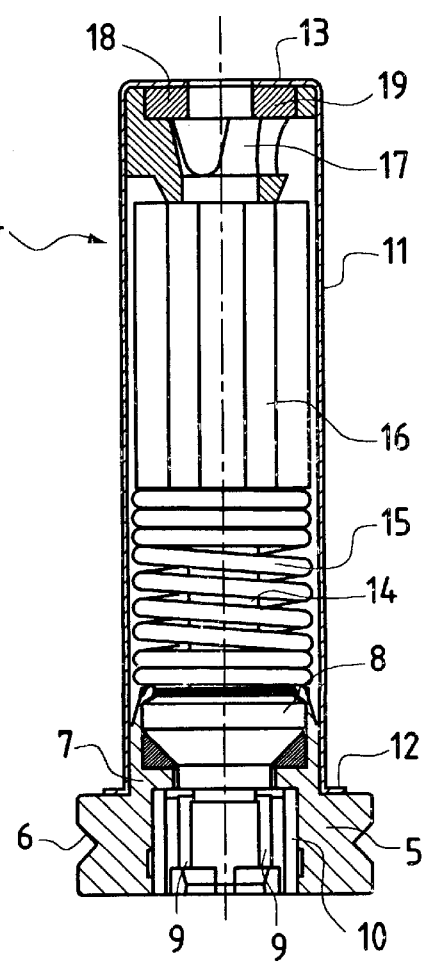
FIG. 8 depicts, in section, the device depicted in FIG. 7.

The way in which the generator thus formed works is now described with more particular reference to FIGS. 3, 4 and 8.

In the event that a collision requiring the operation of the generator is detected, an electrical signal initiates the electropyrotechnic igniter 8 which fires the pyrotechnic charge 16, the combustion gases of which cause the face 13 of the cap 11 to rupture. The hot gases therefore enter the cavity 40 of the shank 39 of the piston 31 and push it forward without being able to enter the neck 37 of the support piece 30 as long as the shank 39 is engaged in the narrow part of the recess 35 located upstream of the shoulder 36. As soon as it begins to move forward, the column 32 which is guided by the external ribs 45 causes the diaphragm 28 to rupture and the cold gases contained in the reservoir chamber 29 begin to flow back into the combustion and mixing chamber through the central orifice 27 to then leave the generator 1 via the orifices 25 without having been mixed with the hot gases. The start of deployment of the protective airbag is therefore accomplished only using cold gases which do not damage the folds of the airbag which are near the gas outlet orifices 25. This then is an additional advantage afforded by the preferred embodiment of the invention.

Under the thrust of the gases resulting from the combustion of the pyrotechnic charge 16, the piston 31 continues to move forward but its stroke is halted when the external ribs 45 come into abutment against the internal partition 26, thus preventing the base 41 of the piston 31 from blocking off the central orifice 27 of the internal partition 26. At this instant, the shank 39 of the piston 31, the length of which has to be shorter than the stroke of the piston, is no longer engaged in the narrow part of the recess 35, and the hot gases resulting from the combustion of the pyrotechnic charge 16 can enter the mixing chamber by flowing around the base 41 of the piston 31 to mix with the cold gases originating from the reservoir chamber 29 and leave the generator via the outlet orifices 25. It should be noted that the solid base 41 of the piston 31 constitutes a deflector, preventing the hot gases from passing directly through the central orifice 27 of the internal partition 26, which prevents them in practice from entering the reservoir chamber 29. For the same characteristics, the chamber 29 used in a generator according to the invention can therefore contain more gas than the same chamber used in a conventional hybrid generator which does not prevent the hot gases from entering the reservoir chamber.

What is claimed is:

1. Hybrid gas generator (1) consisting of a tubular body (2) with an upstream end (3) closed by a pyrotechnic primer device (4) and a downstream end (21) which is closed in a gastight manner, the said tubular body also having gas outlet orifices (25) and containing an internal partition (26) with a central orifice (27) of cross section S closed by a diaphragm (28), the said partition dividing the said tubular body into two parts:

an upstream part forming a combustion and mixing chamber (46) and containing the primer device, the gas outlet orifices and a pyrotechnic charge (16) that generates hot gases, a downstream part forming a reservoir chamber (29) containing at least one pressurized gas, characterized in that the said tubular body consists of a single metal tube and in its upstream part, between the pyrotechnic charge and the said internal partition (26), contains a support piece (30) which is fixed to the said body without coming into contact with the said internal partition or with the said gas outlet orifices and which contains a solid mobile piston (31) consisting of at least one column (32) of cross section s, smaller than the cross section S, which rests against the diaphragm (28), closing the central orifice (27) of the internal partition (26), the said column (32), at its opposite end to the said partition, having a solid base (41) of cross section So larger than S and which bears peripheral ribs (45) preventing the said base (41) from coming into contact with the said central orifice (27).

2. Hybrid generator according to claim 1, characterized in that, prior to pyrotechnic operation, the said support piece (30) and the said solid mobile piston (31) isolate the said pyrotechnic charge (16) from the said gas outlet orifices (25).

3. Hybrid generator according to claim 2, characterized in that the said support piece (30) consists of a hollow ring (33) crimped against the body (2) of the generator (1), the said ring having a central cylindrical recess (35) which has an internal shoulder (36) so that it has a diameter $d_1$ facing the pyrotechnic charge (16) and a diameter $d_2$ facing the internal partition (26), $d_2$ being greater than $d_1$, the said ring (33) being extended, facing the internal partition (26), by a hollow cylindrical neck (37), the inside diameter of which is equal to $d_2$, and the outside diameter of which is smaller than the inside diameter of the tubular body (2).

4. Hybrid generator according to claim 3, characterized in that the said mobile piston (31) consists, on the one hand, of a cylindrical body (38) which has a cylindrical shank (39) of outside diameter $d_1$, a cylindrical base (41) of outside diameter $d_3$ between $d_1$ and $d_2$ and a cylindrical column (32) of cross section s and of length l and, on the other hand, of fins (44) of height h smaller than the length l which surround the column (32) and which rest on the base (41) of the said body, the said fins constituting the peripheral ribs (45).

5. Hybrid generator according to claim 4, characterized in that the said fins (44) constitute a single piece (42) exhibiting a cylindrical central duct of cross section S, the said piece being force fitted onto the said column (32) of the cylindrical body (38).

6. Hybrid generator according to claim 5, characterized in that the said cylindrical body (38) is a metal body and in that the said piece (42) is made of a rigid plastic.

7. Hybrid generator according to claim 1, characterized in that the internal partition (26) and the diaphragm (28) are fixed to the tubular body (2) by a single laser-welding operation performed from the outside by transparency through the said tubular body (2).

* * * * *